Patented Dec. 13, 1938

2,140,375

UNITED STATES PATENT OFFICE 2,140,375

METHOD OF PRODUCING FINELY DIVIDED CALCIUM CARBONATE WHICH DOES NOT AGGLOMERATE

Edward M. Allen, Barberton, and George M. Lynn, deceased, late of Wadsworth, Ohio, by Ethel P. Lynn, administratrix, Wadsworth, Ohio, assignors to Pittsburgh Plate Glass Company, a corporation of Pennsylvania No Drawing. Original application January 21, 1933, Serial No. 652,920. Divided and this application January 15, 1936, Serial No. 59,312

9 Claims. (Cl. 134—58)

The primary object of this invention is to produce calcium carbonate of very fine particle size which has special value as a pigment in the rubber, putty, and paint industries. By "fine" calcium carbonate we mean, having a particle size substantially under one micron in distinction from the present by-product calcium carbonates which are mostly above one micron in average particle diameter.

There are three commercially possible methods of making precipitated calcium carbonate: By mixing together solutions of a soluble calcium salt and a soluble carbonate; by mixing together carbon dioxide gas and calcium hydroxide; and by mixing calcium oxide or hydroxide and a soluble carbonate. Of these, the third is the most advantageous economically in that it produces a valuable by-product, the hydroxide corresponding to the soluble carbonate.

In the usual process for producing caustic soda by reaction of sodium carbonate with calcium hydroxide, the carbonate, dissolved in water, and the lime, in the form of a slurry, are brought together. Alternatively, either quicklime or solid slaked lime is added to a sodium carbonate solution. In order to effect rapid causticization and good conversion, and to obtain a coarse carbonate with a good rate of settle, the reaction is always practiced at a high temperature. The calcium carbonate is then settled out, washed free of caustic, and either discarded or reburned. A small proportion is sold as by-product whiting. Our invention so alters the value of the calcium carbonate, that it becomes the primary product with caustic alkali as the by-product, which is just the reverse of the usual case. However, the practice of our invention produces a caustic in no way inferior to that produced in the usual procedure.

A certain amount of the usual by-product whiting is used in the rubber industry as an inert filler. In a well balanced rubber stock, such as is commonly used for automobile tire inner tubes, this by-product whiting gives a tensile strength at best cure of approximately 2400 pounds per square inch. Such by-product whiting is a relatively coarse pigment for use with rubber, since the particles range from 0.2 micron to 30 microns in diameter, with the greater weight per cent in the range 2.5 to 10 microns.

By our improved process a product is produced of which usually about 95 weight per cent has a particle size of less than 0.5 micron in diameter. When used in the same rubber stock, our product gives a tensile strength of approximately 3500 pounds per square inch. The improvement in tear resistance is even more striking. While ordinary by-product whiting in this same rubber stock gives machine tear values— using a crescent shaped test piece—of four to six pounds, our improved product gives values of 27 to 32 pounds tear resistance.

In accordance with our invention, an aqueous slurry of finely divided calcium carbonate is prepared by suitable methods and the slurry is then treated with suitable coating agents in order to prevent cementation during drying as hereinafter more fully described. Thus, in an illustrative modification of our process, we slake the lime carefully in hot, preferably boiling, water, adding the lime to the water at such a rate as to keep the slurry boiling. Vigorous agitation is desirable at this stage. The resultant lime possesses a very high specific surface (high surface per unit weight), most of the particles ordinarily being smaller than one micron. It will be understood that the specific surface is the ratio between the absolute surface of solute to its total volume. The finer the subdivision, the greater the specific surface and the higher the dispersion of the material in solution. Substantially all of the particles are less than one micron in some one dimension. Between 0.5 and 1.5 gallons of water may be used to each pound of quicklime. The quicklime should preferably be in small pieces so that rapid slaking may be effected. We believe that the combination of high temperature with the consequent rapid slaking, and vigorous agitation prevents the growth of large calcium hydroxide crystals, such as are ordinarily formed by cold slaking of lime.

While the procedure described above is the preferred method of slaking to give fine lime, we have found that fine lime capable of being reacted with alkali carbonate to give fine calcium carbonate can be made by slaking lime in cold water with vigorous agitation and afterwards beating the milk of lime vigorously and for a considerable time. The lower the temperature at which the slaking is carried out, the more beating is necessary to bring the lime to the optimum state for producing fine calcium carbonate. We have found further that if the lime is slaked cold without agitation it can still be brought into a condition suitable for the production of fine calcium carbonate if it is afterwards beaten vigorously and for a sufficiently long time. The further removed are the slaking conditions from the preferred optimum conditions of boiling temperature and simultaneous vigorous agitation, the greater is the amount of work which must be expended in beating to bring the lime to a proper state for making fine calcium carbonate.

The lime slurry is then diluted to approximately 0.5 pound of CaO per gallon, and cooled substantially to room temperature. If the quicklime used is not of high quality, there may be a small amount of relatively coarse material in the lime slurry. If such coarse material is present, it is desirable to remove it at this stage in any convenient manner. We have found screening through a 300 mesh screen to be satisfactory, but do not limit ourselves to this.

The lime slurry is then treated with an excess of sodium carbonate. Enough soda ash usually is added to give from 25 to 50 per cent excess over the stoichiometric ratio, although it is not essential to observe these limits. The soda ash is added rapidly and vigorous agitation is essential at this time. A rise in temperature ranging from 10 degrees C. to 15 degrees C. occurs immediately following the addition of the soda ash.

There appears to be a balance between the work put into the system and the fineness of the calcium carbonate produced. If the milk of lime is sufficiently fine and the agitation adequate, very fine calcium carbonate will be produced, temperature and concentration being suitable. Particles of larger size can be produced if a suitably decreased degree of agitation is employed. While some fine particles will be produced, the bulk of the material can be formed with a uniform particle size, the diameter of the particles being controlled by the degree of agitation. On the other hand, by increasing the degree of agitation over that used for milk of lime prepared under the preferred conditions, fine calcium carbonate can be produced from milk of lime somewhat less fine than the preferred state. The amount of work necessary to convert lime less fine than the preferred state increases rapidly with decrease in fineness of the lime and a limit is placed on the "coarseness" of the lime by the practical difficulties involved in increasing the degree of agitation unduly.

We believe that the combination of lime of high specific surface and soda ash with a fast rate of solubility creates a high concentration of calcium ions and of carbonate ions, which under the conditions of vigorous agitation react together to produce a very large number of crystal nuclei. The relatively low temperature at which the causticization reaction is effected aids in attaining a higher concentration of calcium ions in the solution, since calcium hydroxide is more soluble in cold water than in hot. In consequence of these factors, the reaction product is composed of a very large number of very small crystals. The reaction mixture is then filtered and the calcium carbonate washed in any convenient manner. Washing is continued until the calcium carbonate is free, or substantially free, of caustic. The calcium carbonate may be finaly repulped with water and treated with a coating agent as described below.

We have found that with suitable milk of lime containing 0.5 pound of calcium oxide per gallon and at a temperature between 25 degrees C. and 30 degrees C., with moderate stirring a gel structure is usually formed in the reaction mixture. The mixture stiffens, then sets to a fairly stiff gel in from two to ten minutes, the exact time of gelling being dependent on the concentration of the milk of lime, its fineness, the concentration of the sodium carbonate after it goes into solution, the temperature, and the degree of agitation. We believe the gel structure is due to the formation of an extremely large number of very fine particles, probably hydrated. We believe the gel to be $CaCO_3.5H_2O$, with possibly some Gay-Lussite $(CaCO_3.Na_2CO_3.5H_2O)$. However, the correctness of this assumed explanation in no way effects the merit of our invention of a method of producing fine particle-size calcium carbonate.

On continuous vigorous agitation the gelatinous nature of the reaction mixture disappears and the mixture becomes more fluid. At this stage the calcium carbonate particles are very fine, usually 98 per cent being smaller than one micron in diameter. At extremely high magnification they appear to be mostly stubby prisms of very uniform size. We have found that the breaking up of the gel-form thus at high pH, inhibits the crystal growth of calcium carbonate. When the small crystals are once formed under these conditions, they have little tendency to grow in water suspension.

We have further discovered that the use of more vigorous agitation will prevent the formation of the actual gel structure in the reaction mixture. The mechanical force applied in the agitation apparently keeps the incipient gel structure broken up. The reaction mixture increases considerably in viscosity but can be prevented from actually forming a stiff gel by sufficiently vigorous agitation. The calcium carbonate formed under such conditions is essentially of the same quality as if the gel were allowed to form under more moderate agitation.

Furthermore, we have observed that raising the temperature, other conditions being the same, tends to prevent gel formation. However, decreasing the agitation may offset this temperature effect sufficiently to allow the gel to form. Thus a mixture which would gel at 25 degrees C. to 28 degrees C., was found not to do so at 40 degrees C. However, when the agitation was sufficiently decreased, it did gel at 40 degrees C.

We have discovered that under the conditions of concentration and temperature under which a gel structure will form with no agitation or only very slight agitation, very fine particle-size calcium carbonate can be formed if vigorous agitation is used.

It has also been determined that if the proper conditions of temperature and concentration are observed, very fine particle-size calcium carbonate can be prepared from milk of lime and a solution of sodium carbonate. For example, working at a temperature between 25 degrees C. and 40 degrees C., and at a concentration of 0.5 to 1.5 pounds of, of calcium carbonate per gallon of the reaction mixture, we have produced a satisfactory product in this way. In this case, of course, the milk of lime must be more concentrated in order that the water necessary to dissolve the sodium carbonate may not dilute the final reaction mixture beyond the limits at which a gel can form under conditions of no agitation or only very slight agitation.

We have found that conditions which will insure the formation of very fine particle-size calcium carbonate are: that suitable lime is necessary, as heretofore described; that the reaction between the milk of lime and sodium carbonate should take place within the temperature limits 25 degrees C. to 40 degrees C.; that the final reaction mixture should have a concentration of between 0.5 to 1.5 pounds of calcium carbonate per gallon; and that vigorous agitation should be applied to the reaction mixture.

It has been determined that treatment with a coating agent besides preventing cementation on drying also gives a more friable product, and improves the milling properties of a rubber compound embodying the material as a pigment. Such a treated pigment has a tendency to "ride the bank" on the rubber mill, thereby diminishing the amount of labor required to incorporate the pigment into the rubber batch. Many rubber pigments go through the bite of the mill into the pan and have to be shoveled back onto the rolls, only a small portion of the pigment being incorporated into the rubber with each pass of the bulk of the pigment through the mill. The property which this improved pigment possesses of riding the bank materially decreases the shoveling required and so decreases the labor of mixing. The treatment of the material with a coating agent also causes the particles to cling together to a sufficient degree to decrease the pigment loss by "flying", many fine rubber pigments having a tendency to float in the air and thereby cause waste. The tendency of the particles to cling together is sufficient to decrease this waste to a marked degree, but not so strong as to interfere with ready and complete separation of the particles by the rubber such as is desirable for good dispersion.

The following materials have been discovered to be efficient as coating agents: The higher saturated fatty acid esters of mono, di, and tribasic alcohols such as butyl, glycol and glyceryl stearates and naturally occurring mixtures of esters as found in cocoanut oil, lard, lard oil, corn oil, sperm oil, tallow, etc. These oils are commonly known as non-drying oils. These agents are compatible with rubber or plastics, or with paint, lacquer, and putty vehicles. Vigorous agitation or beating is used to insure uniform dispersion of the coating agent on the surface of the particles. The slurry is then filtered, and the cake dried and disintegrated.

The following examples are typical of a practical application of our invention:

I. Three pounds of quicklime (burned marble, burned limestone, or other suitable burned calcium carbonate), are slaked by being added with adequate stirring to two gallons of hot water at such rate as to maintain the mixture near the boiling point. With the third pound of lime, about a gollon of hot water is gradually added so as to keep the mixture sufficiently fluid for good agitation. Stirring is continued for some time, usually about fifteen minutes, after all the lime has been added. The slurry is then diluted to approximately five gallons, cooled to about room temperature, screened or classified to remove any coarse material, and treated with seven and one-half pounds of light soda ash, the vigorous stirring, which is continued for about thirty minutes. During that time the reaction mixture becomes very stiff, then forms a gel and finally again becomes fluid. It is filtered and washed to remove the soluble salts. When the cake is substantially free from caustic it is repulped in water and one hundred and ten grams of coconut oil is added with continued vigorous stirring to distribute the oil uniformly over the surface of the particles.

II. Three pounds of lime is slaked as in Example I, diluted, freed from coarse material, cooled to approximately 35 degrees C., and treated with seven and one-half pounds of light soda ash, with vigorous stirring, which is continued for about thirty minutes. During that time the reaction mixture passes through a period of markedly higher viscosity without actual gel formation, and again becomes more fluid. It is filtered and washed to remove the soluble salts. When the cake is substantially free from caustic it is repulped in water and one hundred and ten grams of coconut oil is added with continued vigorous stirring to distribute the oil uniformly over the surface of the particles.

III. Three pounds of lime are slaked as in Example I, diluted sufficiently to enable any coarse material to be removed, thickened to about 2 gallons of slurry and mixed with a solution of seven and one-half pounds of sodium carbonate in about three gallons of water, at a temperature of about 30 degrees C., and with vigorous agitation which is continued for about thirty minutes; the reaction mixture in this interval increases and then again decreases in viscosity. The slurry is filtered and washed. When the cake is substantially free from caustic it is repulped in water and one hundred and ten grams of coconut oil is added with continued vigorous stirring to distribute the oil uniformly over the surface of the particles.

The slurry from any of the examples is again dewatered, the cake dried and crumbled. If the coating agent is omitted, the particles may cement themselves together in the cake and vigorous treatment will be necessary to break the aggregates down into the primary particles. This is sometimes done in the practice of this invention in the event that uncoated fine whiting is desired.

It will be noted that there are four variables which may be controlled in successfully producing calcium carbonate of fine particle size. The variables are quality of the milk of lime, concentrations, temperature and degree of agitation. The limits of variation of any one are fixed by values of the other three. Manifestly it is impossible to define exactly limitations for any one of the variables, particularly since a statement of the degree of agitation is a comparative matter at best. Such state of facts should be borne in mind in applying restrictions to interpretation of the scope of the invention herein described and claimed.

This case is a division of our application Serial No. 652,920, filed January 21, 1933.

What we claim is:

1. A method of producing calcium carbonate of fine particle size and adapted for use as a pigment in rubber, which consists in reacting milk of lime of high specific surface with sodium carbonate at an initial temperature between 25° C. and 40° C., vigorously agitating the resulting mixture to produce simultaneously sodium hydroxide and finely divided calcium carbonate, 98 per cent of the particles of said calcium carbonate being of a size less than one micron washing out the sodium hydroxide to obtain a slurry of calcium carbonate substantially free of sodium hydroxide, adding coconut oil to the slurry, vigorously agitating the mixture in order to coat uniformly the particles of calcium carbonate with the coconut oil, filtering the slurry and drying the resultant product.

2. A method of producing calcium carbonate of fine particle size and adapted for use as a pigment in rubber, which consists in reacting milk of lime of high specific surface with sodium carbonate at an initial temperature between 25° C. and 40° C., vigorously agitating the resulting mixture to produce simultaneously sodium hydroxide and finely divided calcium carbonate, 98 per cent of the particles of said calcium carbonate being of a size less than one micron washing out the sodium hydroxide to obtain a slurry of calcium carbonate substantially free of sodium hydroxide, adding approximately 5% by weight of coconut oil to the slurry, vigorously agitating the mixture in order to coat uniformly the particles of calcium carbonate with the coconut oil, filtering the slurry and drying the resultant product.

3. A method of preparing substantially dry, substantially unagglomerated finely divided calcium carbonate 98 per cent of the particles of said calcium carbonate being of a size less than one micron which comprises precipitating said finely divided carbonate in a body of water to form an aqueous slurry thereof incorporating coconut oil in said slurry, and drying the resulting mixture, the proportion of said oil being sufficient to coat a sufficient portion of said calcium carbonate particles to prevent substantial agglomeration thereof during the drying treatment.

4. A method of preparing substantially dry, substantially unagglomerated finely divided calcium carbonate having an average particle size under one micron, which comprises precipitating said finely divided carbonate in a body of water to form an aqueous slurry thereof, incorporating coconut oil in said slurry and drying the resulting mixture, the proportion of said oil being sufficient to coat a sufficient portion of said calcium carbonate particles to prevent substantial agglomeration thereof during the drying treatment.

5. A method of preparing substantially dry, substantially unagglomerated finely divided calcium carbonate, 98 percent of the particles of said calcium carbonate being of a size less than one micron, which comprises precipitating said finely divided carbonate in a body of water to form an aqueous slurry thereof, incorporating an oil of the group consisting of coconut oil, lard, lard oil, corn oil, sperm oil and tallow in said slurry containing said carbonate and drying the resultant mixture, the proportion of said oil being sufficient to coat a sufficient portion of said calcium carbonate particles to prevent substantial agglomeration thereof during the drying treatment.

6. A method of producing calcium carbonate of fine particle size and adapted for use as a pigment in rubber, which consists in reacting milk of lime of high specific surface with an alkali metal carbonate at an initial temperature between 25° C. and 40° C., vigorously agitating the resulting mixture to produce simultaneously an alkali metal hydroxide and finely divided calcium carbonate, 98% of the particles of said calcium carbonate being of a size less than one micron, washing out the alkali metal hydroxide to obtain a slurry of calcium carbonate substantially free of an alkali metal hydroxide, adding an oil of the group consisting of coconut oil, lard, lard oil, corn oil, sperm oil and tallow to the slurry, vigorously agitating the mixture in order to coat uniformly the particles of calcium carbonate with the coconut oil, filtering the slurry and drying the resultant product.

7. The process of claim 4 wherein the calcium carbonate is washed prior to addition of coconut oil thereto.

8. A method of preparing substantially dry, substantially unagglomerated finely divided calcium carbonate having an average particle size under one micron, which comprises precipitating said finely divided carbonate in a body of water to form an aqueous slurry thereof, incorporating an oil of the group consisting of coconut oil, lard, lard oil, corn oil, sperm oil, and tallow in said slurry and drying the resulting mixture, the proportion of said oil being sufficient to coat a sufficient portion of said calcium carbonate particles to prevent substantial agglomeration thereof during the drying treatment.

9. The process of claim 8 wherein the calcium carbonate is washed prior to the addition of the oil thereto.

EDWARD M. ALLEN.
ETHEL P. LYNN.
*Administratrix of the Estate of George M. Lynn, Deceased.*